US012651423B2

(12) United States Patent
Nakatani et al.

(10) Patent No.: US 12,651,423 B2
(45) Date of Patent: Jun. 9, 2026

(54) IMAGE ACQUISITION DEVICE

(71) Applicant: YAMAHA HATSUDOKI KABUSHIKI KAISHA, Iwata (JP)

(72) Inventors: Taiko Nakatani, Shizuoka (JP); Tsuyoshi Kuroda, Shizuoka (JP); Yoshinori Harada, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 93 days.

(21) Appl. No.: 18/921,835

(22) Filed: Oct. 21, 2024

(65) Prior Publication Data

US 2025/0046046 A1 Feb. 6, 2025

Related U.S. Application Data

(63) Continuation-in-part of application No. PCT/JP2022/018456, filed on Apr. 21, 2022.

(51) Int. Cl.
| | |
|---|---|
| *G06V 10/12* | (2022.01) |
| *B25J 9/16* | (2006.01) |
| *G06T 7/80* | (2017.01) |
| *G06V 10/774* | (2022.01) |
| *G06V 20/68* | (2022.01) |

(52) U.S. Cl.
CPC ............ *G06V 10/12* (2022.01); *B25J 9/1697* (2013.01); *G06T 7/80* (2017.01); *G06V 10/774* (2022.01); *G06T 2207/20081* (2013.01); *G06V 20/68* (2022.01)

(58) Field of Classification Search
None
See application file for complete search history.

(56) References Cited

U.S. PATENT DOCUMENTS

| | | | | |
|---|---|---|---|---|
| 2016/0303737 | A1* | 10/2016 | Rossano | B25J 9/1656 |
| 2019/0381657 | A1* | 12/2019 | Ooba | B25J 9/1692 |
| 2020/0376657 | A1* | 12/2020 | Adachi | B25J 9/1697 |
| 2022/0078972 | A1* | 3/2022 | Faulring | B25J 15/0226 |
| 2023/0146679 | A1* | 5/2023 | Lavallée | A61B 34/20 |
| | | | | 700/259 |
| 2025/0360615 | A1* | 11/2025 | Kanai | B25J 9/163 |

FOREIGN PATENT DOCUMENTS

| | | |
|---|---|---|
| CN | 112232263 A | 1/2021 |
| WO | 2021044473 A1 | 3/2021 |
| WO | 2022038913 A1 | 2/2022 |

* cited by examiner

*Primary Examiner* — Ryan Rink
(74) *Attorney, Agent, or Firm* — Rabin & Berdo, P.C.

(57) ABSTRACT

An image acquisition device for a work device performing a task on a target. The image acquisition device includes: an imaging device capturing an image of the target; and an imaging tool that includes a model of the work device and is operable by an operator. The imaging device is attachable to and detachable from each of the work device and the imaging tool, such that that a relative position between the imaging device and the model and that between the imaging device and the work device are identical when the imaging device is attached to the model and the work device. The imaging device captures a part of the model and a part of the work device along with the target when the imaging device is respectively attached to the imaging tool and the work device, the part of the model corresponding to the part of the work device.

5 Claims, 7 Drawing Sheets

11: FIRST IMAGING CONTROLLER
12: SECOND IMAGING CONTROLLER
25: ROBOT-ARM-CONTROL DEVICE
32: IMAGING TOOL

11: FIRST IMAGING CONTROLLER
12: SECOND IMAGING CONTROLLER
25: ROBOT-ARM-CONTROL DEVICE
32: IMAGING TOOL

11: FIRST IMAGING CONTROLLER     42: STORAGE DEVICE
12: SECOND IMAGING CONTROLLER    43: TRANSMISSION DEVICE
20: ROBOT ARM DEVICE             60: SERVER
24: CAMARA UNIT                  L1: CONNECTION CABLE
25: ROBOT-ARM-CONTROL DEVICE     L2: CONNECTION CABLE
31: IMAGE ACQUISITION DEVICE
35: TRIGGER BUTTON
36: DISPLAY DEVICE               FIG. 2

12: SECOND IMAGING CONTROLLER
25: ROBOT-ARM-CONTROL DEVICE

```
 7: COMMUNICATION DEVICE        25: ROBOT-ARM-CONTROL DEVICE
11: FIRST IMAGING CONTROLLER    27: IMAGE RECOGNITION PROCESSOR
12: SECOND IMAGING CONTROLLER   28: DRIVING CONTROLLER
20: ROBOT ARM DEVICE            31: IMAGE ACQUISITION DEVICE
21: ARTICULATED ROBOT ARM       32: IMAGING TOOL
23: END EFFECTOR                L1: CONNECTION CABLE
24: CAMARA UNIT                 L2: CONNECTION CABLE
```

IMAGE ACQUISITION DEVICE

CROSS-REFERENCES TO RELATED APPLICATIONS

This is a continuation-in-part application of International Application No. PCT/JP2022/018456, filed on Apr. 21, 2022, the contents of which are incorporated herein by reference.

TECHNICAL FIELD

The present teaching relates to an image acquisition device.

BACKGROUND ART

Fruits such as strawberries and grapes and green-and-yellow vegetables such as asparagus and tomatoes are more delicate and easily damaged than grains such as rice and wheat, and also have higher unit prices. Such delicate and high-priced crops are harvested manually one by one to avoid damage during harvest. Therefore, as compared to, for example, grains that can be efficiently and extensively harvested using machines such as combine harvesters, harvest of the fruits and the green-and-yellow vegetables involves a greater physical burden on producers. Because the physically demanding harvest work involves difficulty in securing labor, the burden on producers tends to increase.

Thus, a harvest system using an articulated robot arm is known. In the harvest system, a work device, an image processor, and other devices for harvesting crops are mounted on the distal end of the articulated robot arm. The harvest system causes the image processor to identify the location of crops to be harvested and causes the work device to perform harvest work. Crops are all different in shape, placed under different surrounding conditions during harvest, and so forth. Thus, the image processor may, in some cases, be unable to accurately detect crops under the influence of situations such as the shape of crops, the surrounding conditions during harvest, and the weather in the field.

Thus, a method of identifying a target that improves the identification accuracy is known, using training images of crops captured under conditions in which the crops are harvested as training data. A method of identifying tomatoes based on deep learning described in Patent Document 1 performs deep learning using training images of tomatoes, as targets, captured under natural outdoor light where the tomatoes are grown. In that case, images of tomatoes captured under as different conditions as possible are used as the training images. For example, the tomato images include images with different weather conditions and times during image capture, different imaging angles, and different shapes of tomatoes, images containing a plurality of tomatoes, and images containing objects other than tomatoes. Using such training images serves to improve the recognition rate of tomatoes under complex conditions.

CITATION LIST

Patent Document

Patent Document 1: Chinese Patent Application Publication No. 112232263

SUMMARY OF INVENTION

Technical Problem

The tomato identification method of Patent Document 1 is also applicable to tomato-picking robots for picking tomatoes identified through image recognition, and the like. Images acquired by tomato-picking robots during harvest, in many cases, include end effectors for picking tomatoes, and the like. On the other hand, the training images captured by an operator and the like, using an imaging device in the tomato identification method described above, are free of images of the end effector and the like. If such images, free of the end effector and the like, are used as training images, the inclusion of the end effector and the like in the images acquired by the tomato-picking robot during harvest may reduce the tomato recognition rate. In addition, it would be impractical to collect training data including images of the end effector and the like using the tomato-picking robot, as it would require a great deal of time and labor.

It is, therefore, an object of the present teaching to provide an image acquisition device capable of acquiring training images that improve the recognition rate of a target on which a work device performs a task.

Solution to Problem

The inventors of the present teaching have studied an image acquisition device capable of acquiring training images that improve the recognition rate of a target on which a work device performs a task. Through their intensive study, the inventors have arrived at the configuration as described below.

An image recognition device for a work device configured to perform a task on a target according to one embodiment of the present teaching comprises: an imaging device including a camera, configured to capture an image of the target; and an imaging tool that includes a model of at least a part of the work device and is operable by an operator, wherein the imaging device is configured to be attachable to and detachable from each of the work device and the imaging tool, in such a way that a relative position between the imaging device and the model, when the imaging device is attached to the imaging tool, is identical to that between the imaging device and the work device when the imaging device is attached to the work device, and capture a part of the model along with the target when the imaging device is attached to the imaging tool, and capture a part of the work device along with the target when the imaging device is attached to the work device, the part of the model corresponding to the part of the work device.

As described above, the image acquisition device can acquire an image that includes the model and the target by the imaging device attached to the imaging tool. By attaching the imaging device to the imaging tool, the image acquisition device can acquire images of the target by an operator under various conditions at an actual site where the work device performs tasks. In addition, the image acquisition device uses the imaging device attached to the imaging tool to capture an image of the target, thereby enabling the image acquisition device to acquire an image in which the position of the model approximately matches that of the work device in an image captured by the imaging device attached to the work device.

In a case where the work device detects an image by machine learning using training data to perform a task on the target, training images for the training data preferably include a part of the work device in the same positional relationship as that in an image captured by the imaging device during the task. In addition, the training images preferably include images in which the target of various shapes is captured under various conditions. Therefore, the image acquisition device can acquire preferred images that include the model and are captured under various conditions, as the training images for machine learning.

This allows for the acquisition of training images that improve the recognition rate of the target on which the work device performs a task.

In another aspect, the image recognition device according to the present teaching preferably includes the following configuration. The imaging tool includes a storage device configured to store each image acquired by the imaging device, and a transmission device configured to output each image stored in the storage device.

As described above, when capturing an image by the attached imaging device, the imaging tool records the captured image in the storage device. Furthermore, the imaging tool transmits the captured image to an external server that performs machine learning by the transmission device. Thus, the image acquisition device can readily capture the training images for machine learning under various conditions by the imaging tool.

This allows for the acquisition of training images that improve the recognition rate of the target on which the work device performs a task.

In another aspect, the image recognition device according to the present teaching preferably includes the following configuration. The model has a same shape and a same color as the at least a part of the work device.

As described above, the image captured by the imaging device attached to the imaging tool includes an image of the model of at least a part of the work device. The shape and color of the model are approximately the same as the shape and color of the work device. Therefore, the shape, positional relationship and color of the image of the model in the image captured by the imaging device attached to the imaging tool are approximately the same as the shape, positional relationship and color of the image of the work device in the image captured by the imaging device attached to the work device. Therefore, in the images captured by the imaging device attached to the imaging tool, factors, which could reduce the recognition rate in machine learning, are suppressed.

This allows for the acquisition of training images that improve the recognition rate of the target on which the work device performs a task.

In another aspect, the image recognition device according to the present teaching preferably includes the following configuration. The image recognition device further comprises an imaging controller including a processor and a non-transitory storage medium, the imaging controller configured to adjust an imaging condition of the imaging device, using the part of the model included in the image captured by the imaging device attached to the imaging tool.

As described above, the image captured by the imaging device attached to the imaging tool includes the image of the model of at least a part of the work device. The shape of the model is approximately the same as the work device. Therefore, the shape and positional relationship of the image of the model in the image captured by the imaging device attached to the imaging tool are approximately the same as the shape and positional relationship of the image of the work device in the image captured by the imaging device attached to the work device. Therefore, the image acquisition device can calibrate exposure time, exposure, color tone, and the like of the imaging device to enable proper detection of the target, using the images of the model included in the images captured under various conditions by the imaging device attached to the imaging tool.

This allows for the acquisition of training images that improve the recognition rate of the target on which the work device performs a task.

The terminology used herein is for the purpose of describing particular embodiments only and is not intended to be limiting of the invention.

As used herein, the term "and/or" includes any and all combinations of one or more of the associated listed items.

It will be further understood that the terms "including," "comprising" or "having" and variations thereof when used in this specification specify the presence of stated features, steps, operations, elements, components, and/or their equivalents, but do not preclude the presence or addition of one or more steps, operations, elements, components, and/or groups thereof.

It will be further understood that the terms "mounted," "connected," "coupled," and/or their equivalents are used broadly and encompass both direct and indirect mounting, connecting and coupling. Further, "connected" and "coupled" are not restricted to physical or mechanical connections or couplings, and can include electrical connections or couplings, whether direct or indirect.

Unless otherwise defined, all terms (including technical and scientific terms) used herein have the same meaning as commonly understood by one having ordinary skill in the art to which this invention belongs.

It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the invention.

Embodiments of an image acquisition device according to the present teaching will be herein described.

In the following description, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

[Work Device]

A work device herein refers to a machine for moving an end effector to a predetermined position to allow the end effector to perform processing on a target. The work device can be any device capable of moving the end effector, such as a robot arm, an unmanned aerial vehicle, or an unmanned ground vehicle.

[End Effector]

An end effector herein refers to a device for performing arbitrary processing on a target. The end effector is attached to an end of the work device such as an articulated robot arm. The end effector has a configuration that corresponds to the processing performed on the target, and includes various devices corresponding to the various types of processing.

[Target]

A target herein refers to the object of processing by the end effector, such as natural objects, artifacts, viruses, or living organisms (animals, plants). The target specifically refers to agricultural products, marine products, industrial products, livestock, insects, humans, and the like. The target is an object including both a processing portion that is a portion processed by the end effector, and a contacted portion contacted by a contact part of the end effector to move the processing portion to a processing position. The target includes, for example, peduncles, fruit, trunks, stems, branches, leaves, stalks and living organisms in agricultural products.

[Imaging Device]

An imaging device herein refers to imaging equipment that includes various types of imaging devices such as a monocular camera and a stereo camera. The imaging device is attachable to and detachable from both the work device and an imaging tool.

[Image Acquisition Device]

An image acquisition device herein refers to a device for acquiring images for machine learning for a detection task used by the work device to detect the target, as well as images for detecting the target when the work device performs a task on the target. That is, the images acquired by the image acquisition device are used as training images for machine learning. A trained model, which can be obtained by performing machine learning using the training images as training data, corresponds to the above detection task.

[Imaging Tool]

An imaging tool herein refers to equipment that can be carried by an operator. The imaging tool includes a model of at least a part of the work device. The imaging tool allows the imaging device to be attached to and detached from it. The imaging tool with the imaging device attached can capture an image of the target using the imaging device.

Advantageous Effects of Invention

According to one embodiment of the present teaching, it is possible to acquire training images that improve the recognition rate of a target on which a work device performs a task.

DESCRIPTION OF EMBODIMENTS

Figure 1:
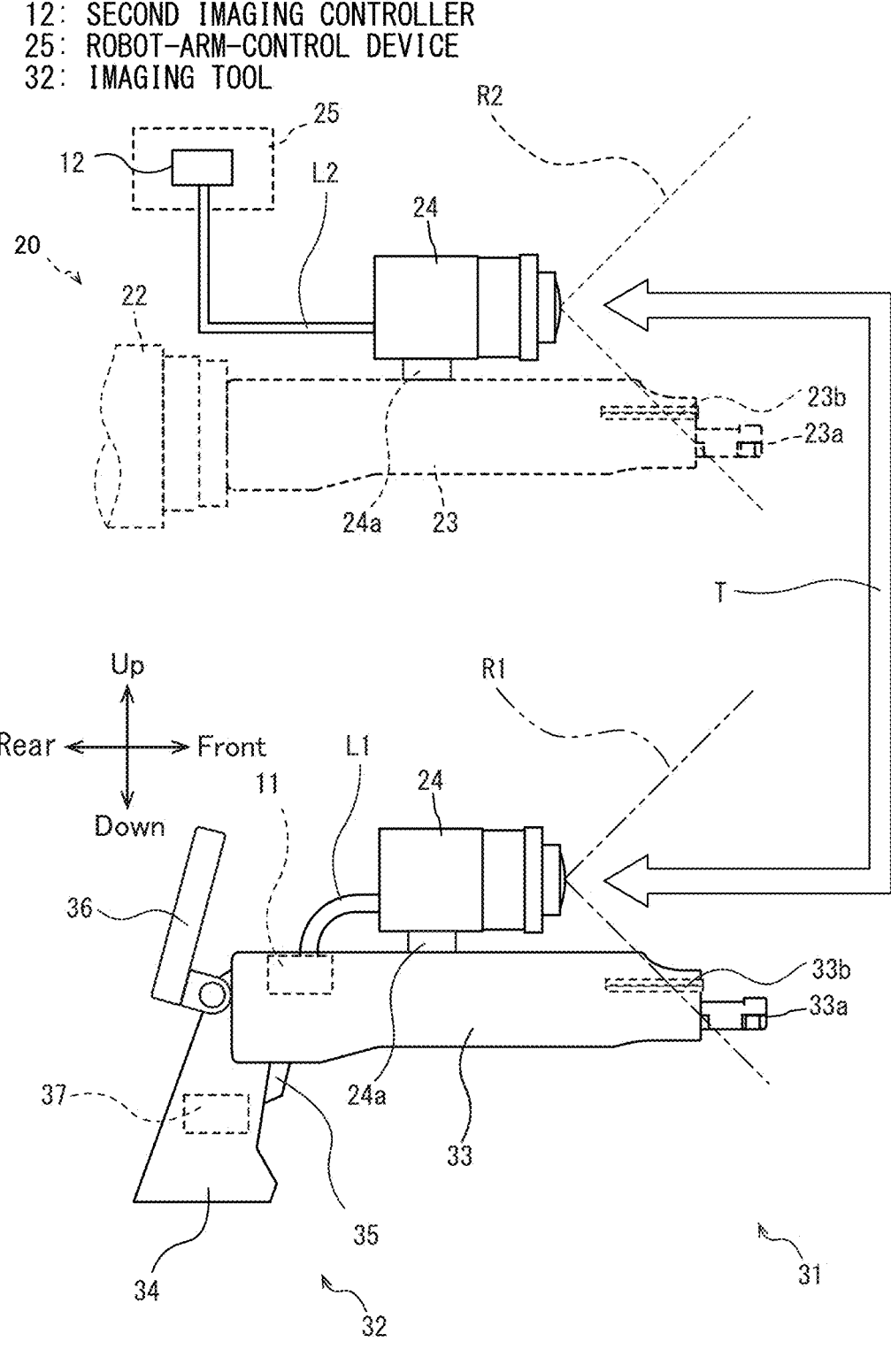
FIG. 1 is a schematic view of an image acquisition device according to an embodiment of the present teaching.

Embodiments will be described hereinafter with reference to the drawings. In the drawings, the same or corresponding parts are denoted by the same reference numerals, and description thereof will not be repeated. The dimensions of components in the drawings do not strictly represent actual dimensions of the components, dimensional proportions of the components, and the like.

Embodiment (Overall Configuration of Image Acquisition Device)

Figure 2:
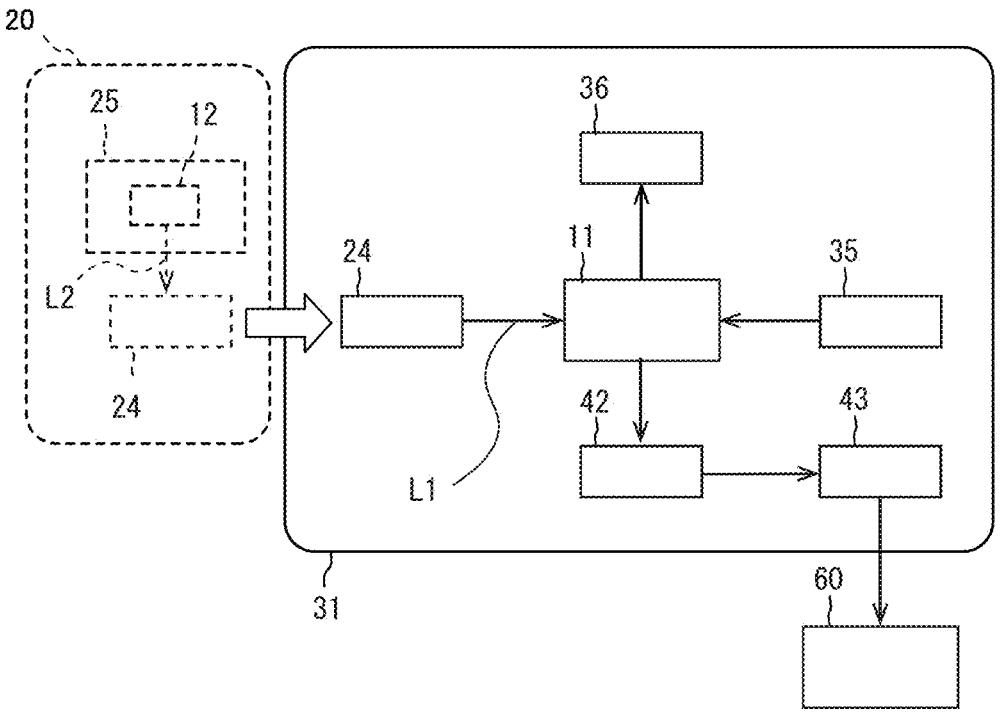
FIG. 2 is a block diagram of a control configuration of the image acquisition device shown in FIG. 1.

The overall configuration of an image acquisition device according to an embodiment of the present teaching will be described with reference to FIGS. 1 and 2. FIG. 1 is a schematic view of an image acquisition device 31 according to an embodiment of the present teaching. FIG. 2 is a block diagram of a control configuration of the image acquisition device 31 shown in FIG. 1.

Hereinafter, arrow "Front" in the drawings indicates a forward direction of an imaging tool 32 and an end effector 23. Arrow "Rear" in the drawings indicates a rearward direction of the imaging tool 32 and the end effector 23. Arrow "Up" in the drawings indicates an upward direction of the imaging tool 32 and the end effector 23. Arrow "Down" in the drawings indicates a downward direction of the imaging tool 32 and the end effector 23. A front-rear direction of the imaging tool 32 and the end effector 23 is defined such that the forward direction of the imaging tool 32 and the end effector 23 is an imaging direction of a camera unit attached to the imaging tool 32 or the end effector 23. A left-right direction of the imaging tool 32 and the end effector 23 is a direction perpendicular to the front-rear direction and an up-down direction of the imaging tool 32 and the end effector 23, where the vertical direction is defined as the up-down direction.

The image acquisition device 31 acquires a training image K1 (see FIG. 3) for image recognition processing of a target in a work device, as well as an image for recognition (recognition image) K2 (see FIG. 7) for the image recognition processing to detect the target in the work device. In this embodiment, the work device is a robot arm device 20. The target is the object of processing by the work device. Hereinafter, a case where the robot arm device 20 harvests grapes as the target will be described.

The image acquisition device 31 specifically includes a camera unit 24, the imaging tool 32, a display device 36, a battery 37, a first imaging controller 11 as an imaging controller, a storage device 42, and a transmission device 43.

The camera unit 24 captures a training image K1 for use in machine learning while being attached to the imaging tool 32. The camera unit 24 also captures a recognition image K2 for executing a detection task while being attached to the end effector 23 of the robot arm device 20. The camera unit 24 is a stereo camera that captures a parallax image. The camera unit 24 is specifically configured such that two monocular cameras are disposed in the left-right direction of the imaging tool 32, with their imaging direction aligned along the forward direction. The camera unit 24 functions as an imaging device. The monocular cameras are cameras for capturing images of grapes from a single viewpoint. The monocular cameras are digital cameras using an image sensor, such as a Charge-Coupled Device (CCD) sensor or a Complementary Metal-Oxide Semiconductor (CMOS) sensor. The camera unit 24 generates a parallax image based on images captured by the two monocular cameras.

As shown by arrow T, the camera unit 24 is attachable to and detachable from the end effector 23 and the imaging tool 32 via a base 24a. That is, the camera unit 24, detached from the end effector 23, can be attached to the imaging tool 32. An operator can carry the imaging tool 32 with the camera unit 24 attached to any location in the field and capture a training image K1. The camera unit 24, detached from the imaging tool 32, can be attached to the end effector 23. The robot arm device 20 can capture a recognition image K2 by the camera unit 24 attached to the end effector 23.

The imaging tool 32 is equipment to which the camera unit 24 is attached and which can be carried and operated for image capture by the operator. The imaging tool 32 includes a model 33, a grip 34, and a trigger button 35.

The model 33 is a dummy that has the same shape and the same color as the end effector 23 of the robot arm device 20. The model 33 includes a dummy gripping device 33a designed to resemble a gripping device 23a of the end effector 23, and a dummy cutting device 33b designed to resemble a cutting device 23b of the end effector 23. The dummy gripping device 33a and the dummy cutting device 33b are set to the same state as that of the end effector 23 at the start of controlling the harvest work described above. An upper surface of the model 33 is configured such that the camera unit 24 can be supported via the base 24a. The camera unit 24 is disposed on the model 33 such that a part of the upper surface of the model 33 and a part of the dummy gripping device 33a of the model 33 are included within an angle of view R1 of the camera unit 24. Note that the angle of view refers to an angle indicating an actual imaging range captured by the image sensors included in the camera unit 24. In this manner, the camera unit 24 detached from the end effector 23 can be attached to the model 33.

A positional relationship of the camera unit 24 with respect to the model 33 with the camera unit 24 attached to the imaging tool 32 is the same as a positional relationship of the camera unit 24 with respect to the end effector 23 with the camera unit 24 attached to the robot arm device 20. Therefore, a shape of the model 33, a position of the model 33, and a color of the model 33 in a training image K1 captured by the camera unit 24 with the camera unit 24 attached to the model 33 are the same as a shape of the end effector 23, a position of the end effector 23, and a color of the end effector 23 in a recognition image K2 captured by the camera unit 24 with the camera unit 24 attached to the robot arm device 20.

The grip 34 is connected to the model 33 that is held by the operator in the case where the operator carries the imaging tool 32 and in the case where the operator captures images by the camera unit 24. The grip 34 is located further rearward than an attachment position of the camera unit 24 on the model 33.

The trigger button 35 is an operation button for capturing images by the camera unit 24 attached to the model 33. The trigger button 35 is provided on the grip 34. Thus, in the case where the operator captures images using the image acquisition device 31, the operator can operate the trigger button 35 while holding the grip 34.

The display device 36 displays images captured by the camera unit 24. The display device 36 is attached to the grip 34 of the imaging tool 32. The display device 36 can be constituted by a display device, such as a liquid crystal display or an organic electroluminescent (EL) display. The display device 36 may include a tilt mechanism. For example, the display device 36 may be attached such that it can be tilted within a certain range in the front-rear direction with respect to the grip 34.

The battery 37 supplies electricity to various sections of the image acquisition device 31 and the camera unit 24, which are connected by a connection line L1. The battery 37 can be, for example, disposed inside the grip 34.

The imaging controller is a device for controlling the image acquisition device 31. In substance, the imaging controller may be configured with components such as a Central Processing Unit (CPU), a Read-Only Memory (ROM), a Random Access Memory (RAM), a Hard Disk Drive (HDD), and a Solid State Drive (SSD) connected via a bus, or it may be constituted by a single-chip Large Scale Integration (LSI) and the like. The imaging controller stores various programs and/or data to control functions of the camera unit 24, the display device 36, the storage device 42, and the transmission device 43 of the image acquisition device 31. The imaging controller has the first imaging controller 11 for controlling the camera unit 24 attached to the imaging tool 32, and a second imaging controller 12 for controlling the camera unit 24 attached to the end effector 23.

The first imaging controller is, for example, provided inside the model 33. The first imaging controller 11 is electrically connected to the camera unit 24, the display device 36, the storage device 42, and the transmission device 43. The first imaging controller 11 is connected to the camera unit 24 via the connection cable L1 to be attachable to and detachable from the camera unit 24. Training images K1 are input to the first imaging controller 11 from the camera unit 24. The first imaging controller 11 outputs control signals to the camera unit 24, the display device 36, the storage device 42, and the transmission device 43. The first imaging controller 11 also outputs the training images K1 to the display device 36, the storage device 42, and the transmission device 43.

The second imaging controller 12 is, for example, provided in a robot-arm-control device 25 of the robot arm device 20. The second imaging controller 12 is connected to the camera unit 24 via a connection cable L2 to be attachable to and detachable from the camera unit 24. Recognition images K2 are input to the second imaging controller 12 from the camera unit 24. The second imaging controller 12 also outputs control signals to the camera unit 24.

The storage device 42 is a storage device for recording the training images K1. The storage device 42 is, for example, a main storage device, an auxiliary storage device, or an external storage device. The storage device 42 is electrically connected to the first imaging controller 11. The storage device 42 records the training images K1 input from the first imaging controller 11. The storage device 42 is, for example, provided inside the model 33.

The transmission device 43 uploads the training images K1 recorded in the storage device 42 to an external server 60 via a communication network. The transmission device 43 is electrically connected to the first imaging controller 11 and the storage device 42. The timing of upload of the training images K1 by the transmission device 43 is arbitrary, and may be either at regular intervals, upon user instruction, or in real time, for example. The transmission device 43 is, for example, provided inside the model 33.

(Image Capture Operation by Operator Using Imaging Tool)

Figure 3:
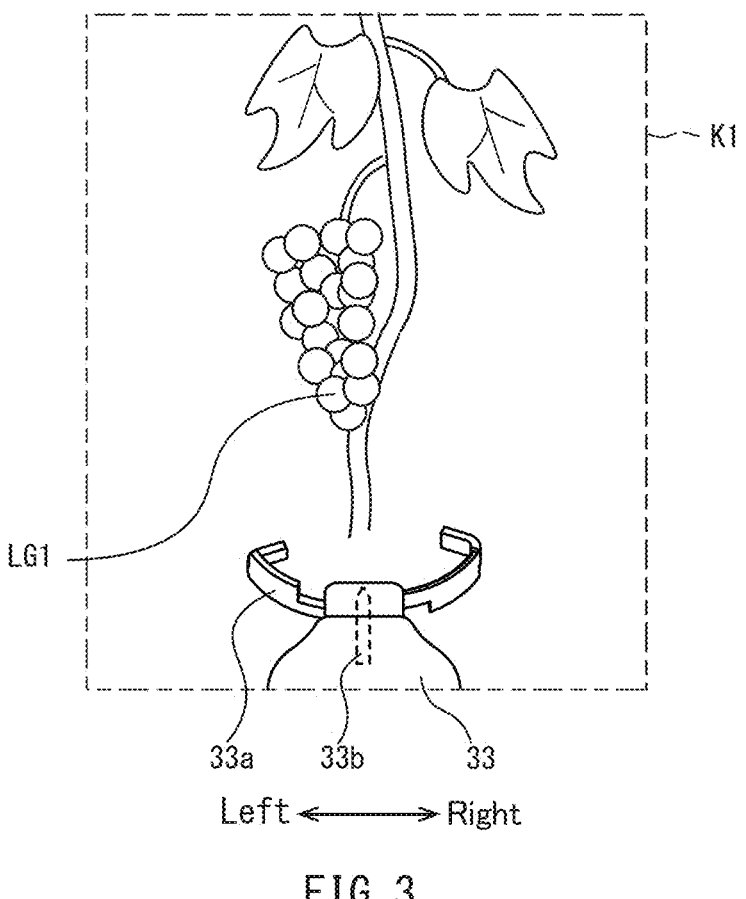
FIG. 3 is a view showing an example of a training image acquired by the image acquisition device shown in FIG. 1.

Image capture operation for a training image K1 by an operator using the imaging tool 32 will now be described with reference to FIGS. 2 and 3. FIG. 3 is a view showing an example of the training image K1 acquired by the imaging tool 32 shown in FIG. 1.

First, the operator detaches the connection cable L2 from the camera unit 24 attached to the end effector 23 of the robot arm device 20. The operator also detaches the camera unit 24 from the end effector 23. The operator then attaches the detached camera unit 24 to the model 33 of the imaging tool 32. Furthermore, the operator connects the connection cable L1 to the camera unit 24. This switches the camera unit 24 from a state where it can capture images at the robot arm device 20 to a state where it can capture images at the imaging tool 32.

The operator captures an image of grapes using the camera unit 24 by operating the trigger button 35 provided on the grip 34 of the imaging tool 32.

When the first imaging controller 11 detects an operation of the trigger button 35, it sends a control signal to the camera unit 24 via the connection cable L1, for instructing the camera unit 24 to capture an image. In response to this, the camera unit 24 captures an image of the grapes. The training image K1 captured by the camera unit 24 may be in either still image format or video format. The image format may be changed in accordance with the operation of the trigger button 35. For example, in the case where the trigger button 35 is operated, the first imaging controller 11 outputs a control signal to the camera unit 24 to capture a still image. In the case where the trigger button 35 is held down for a certain period of time or longer, the first imaging controller 11 outputs a control signal to the camera unit 24 to capture a video.

The operator captures an image of the grapes with the grapes located within the angle of view. The image acquisition device 31 can capture an image including a part of the model 33 and the grapes while the operator holds the imaging tool 32.

The imaging tool 32 is configured such that it can be carried by the operator. Therefore, the operator can move to any location in the field with the imaging tool 32 in hand and capture an image of the grapes. In addition, when capturing images, the operator can operate the imaging tool 32 while monitoring the content being captured by the camera unit 24 on the display device 36.

As described above, the camera unit 24 is disposed on the model 33 such that a part of the upper surface of the model 33 and a part of the dummy gripping device 33a of the model 33 are located within the angle of view R1 of the camera unit 24. On the other hand, with the camera unit attached to the end effector 23 of the robot arm device 20, the camera unit 24 is disposed on the end effector 23 such that a part of an upper surface of the end effector 23 and a part of the gripping device 23a of the end effector 23 are located within an angle of view R2 of the camera unit 24.

A positional relationship of the camera unit 24 attached to the model 33 with respect to the upper surface of the model 33, the dummy gripping device 33a, and the dummy cutting device 33b is the same as a positional relationship of the camera unit 24 attached to the end effector 23 with respect to the upper surface of the end effector 23, the gripping device 23a, and the cutting device 23b.

With reference to FIG. 3, the training image K1 captured by the camera unit 24 includes grapes LG1 as a target, as well as a part of the upper surface of the model 33 and a part of the dummy gripping device 33a of the model 33.

A shape of the dummy gripping device 33a is the same as a shape of the gripping device 23a of the end effector 23 when the gripping device 23a is in its open state. Note that the dummy cutting device 33b, indicated by dashed lines, is located in the model 33 in the same retracted position as the cutting device 23b in the end effector 23, and is also located outside the angle of view R1. Thus, the model 33 has the same shape as the end effector 23 of the robot arm device 20. Furthermore, the model 33 is made of the same material and color as the end effector 23 of the robot arm device 20.

The first imaging controller 11 acquires the training image K1 captured as described above from the camera unit 24. The first imaging controller 11 displays the acquired training image K1 on the display device 36 and outputs it to the storage device 42.

The operator repeats the image capture operations as described above as many times as necessary. Note that the image acquisition device 31 may adjust imaging conditions of the camera unit 24, using the images of the imaging tool 32 included in the training images K1 captured by the camera unit 24 attached to the imaging tool 32. That is, the image acquisition device 31 can adjust the imaging conditions for the next image capture, using the training images K1 that have already been captured. More detailed descriptions are provided below.

The image captured by the camera unit 24 attached to the imaging tool 32 includes an image of the model 33. The shape and the like of the model 33 are approximately the same as those of the end effector 23 provided at the robot arm device 20. Therefore, the shape, positional relationship and color of the image of the model 33 in the image captured by the camera unit 24 attached to the imaging tool 32 are approximately the same as the shape, positional relationship and color of the image of the end effector 23 in the image captured by the camera unit 24 attached to the end effector 23.

Therefore, the image acquisition device 31 can calibrate exposure time, exposure, color tone, and the like of the camera unit 24 to enable proper detection of grapes, using the images of the model 33 included in the images captured under various conditions by the camera unit 24 attached to the imaging tool 32. This allows for the acquisition of the training images K1 that improve the recognition rate of grapes to be harvested by the robot arm device 20.

The plurality of training images K1 thus recorded in the storage device 42 are uploaded from the imaging tool 32 to the server 60.

The external server 60 performs machine learning using the uploaded plurality of training images K1 as training data to obtain a trained model. The trained model obtained in this manner is implemented into the robot-arm-control device 25 as a detection task for use in the image recognition processing in the robot-arm-control device 25.

The effect of acquiring the training images K1 using the imaging tool 32 in this manner is described below.

In the case of detecting images of grapes from recognition images K2 that include grapes as a target by using machine learning with training data, it is preferable that the training images K1 include a part of the model 33 in the same positional relationship as a part of the end effector 23 in the recognition images K2 captured during operation by the camera unit 24 attached to the end effector 23 that is a part of the robot arm device 20. It is also preferable that the training images K1 be images including grapes of various shapes captured under various conditions.

Thus, the image acquisition device 31 uses the imaging tool 32 to capture an image of grapes, and can thereby acquire, as the training images K1 for machine learning, images captured under various conditions, including a part of the model 33 that is the same as a part of the end effector 23 always included in the recognition images K2, along with the grapes as the target. Therefore, the training images K1 can be used in the grape detection task for the robot arm device 20. This allows for the improvement of the recognition rate of grapes in the recognition images K2 by using the trained model obtained through machine leaning with the acquired training images K1 as the training data.

In addition, objects, other than grapes, that appear in the image captured by the robot arm device 20 and in the image captured by the imaging tool 32 are set to have the same conditions not only in terms of their positional relationship but also in terms of their shape and color. Therefore, in the training images K1 captured by the camera unit 24 attached to the imaging tool 32, factors, which could reduce the recognition rate in machine learning, are suppressed. This allows for the acquisition of the training images K1 that improve the recognition rate of grapes to be harvested by the robot arm device 20.

As described above, when the imaging tool 32 has captured an image by the attached camera unit 24, the imaging tool 32 records the captured image in the storage device 42. Furthermore, the imaging tool 32 transmits, by the transmission device 43, the captured training image K1 to the external server 60 that performs machine learning. Therefore, the image acquisition device 31 can readily use a plurality of images captured under various conditions by the imaging tool 32 as the training images K1 for machine learning. In this manner, it is possible to acquire the training images K1 that improve the recognition rate of grapes to be harvested by the robot arm device 20.

Note that at the time of harvest work, the camera unit 24 attached to the imaging tool 32 is attached to the end effector 23 that is a part of the robot arm device 20. The robot arm device 20 performs the harvest work using the implemented detection task.

(Overall Configuration of Robot Arm Device)

Figure 4:
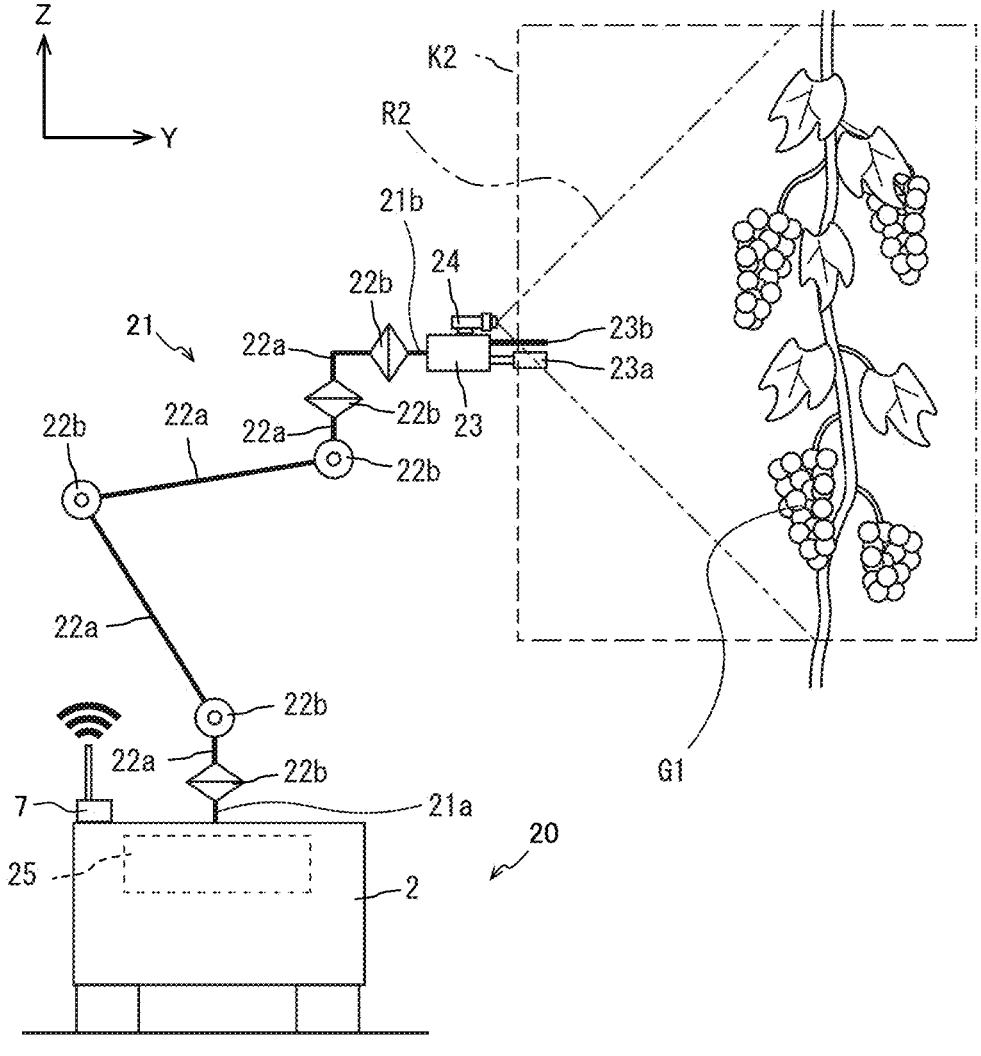
FIG. 4 is a schematic view of a remotely operated vehicle equipped with a robot arm device according to the embodiment of the present teaching.
Figure 5:
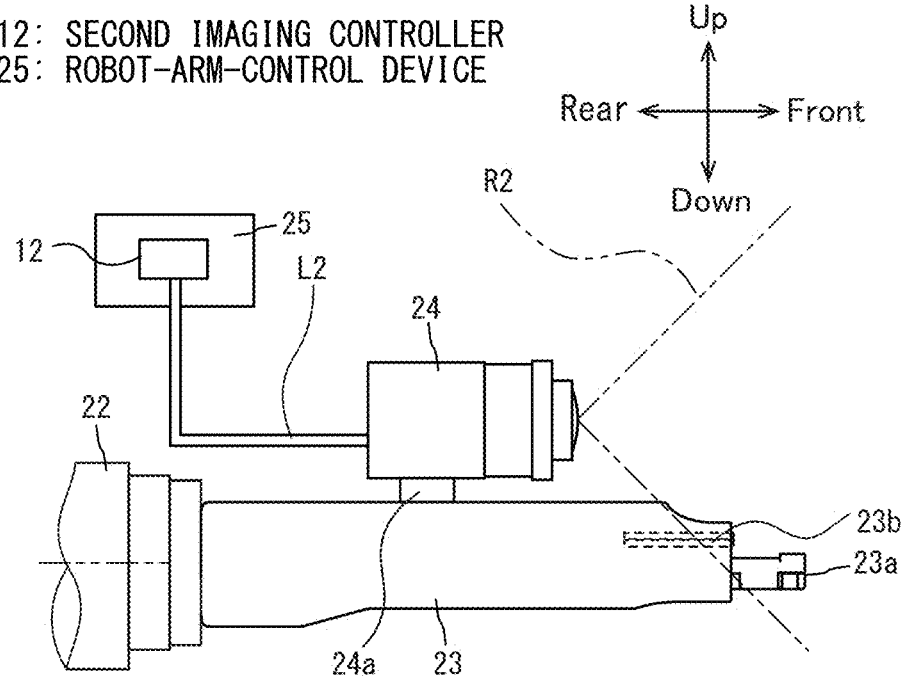
FIG. 5 is a side view of an end effector provided in the robot arm device shown in FIG. 4.
Figure 6:
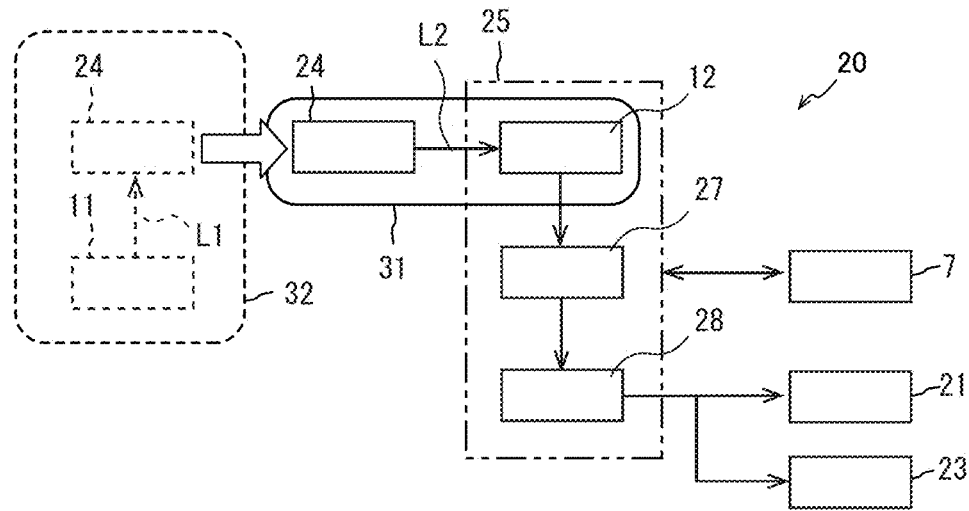
FIG. 6 is a block diagram of a robot-arm-control device.
Figure 7:
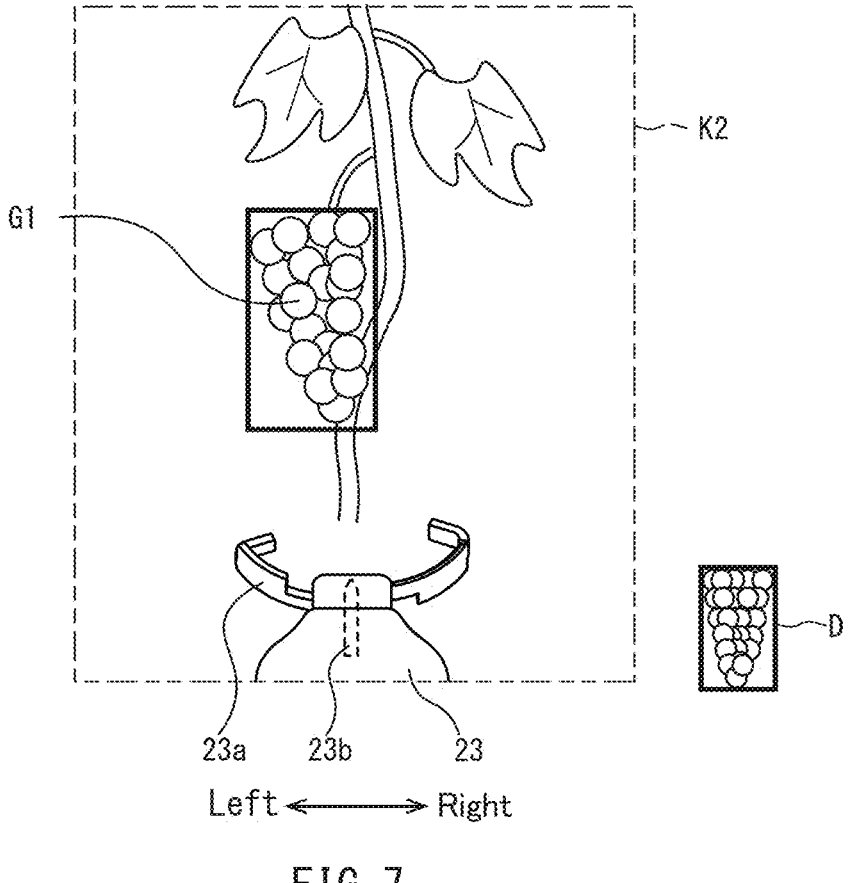
FIG. 7 is a view showing an example of an image for recognition acquired by the robot arm device shown in FIG. 4.

Next, the overall configuration of the robot arm device 20 including the image acquisition device according to the embodiment of the present teaching will be described with reference to FIGS. 4 to 7. FIG. 4 is a schematic view of a remotely operated vehicle equipped with the robot arm device 20 according to the embodiment of the present teaching. FIG. 5 is a side view of the end effector according to the embodiment of the present teaching. FIG. 6 is a block diagram of the robot-arm-control device 25. FIG. 7 is a view showing an example of the recognition image K2 acquired by the robot arm device 20 shown in FIG. 4.

As described above, the robot arm device 20 harvests grapes as a target, for example. The robot arm device 20 is the work device for harvesting grapes in the field. The robot arm device 20 performs the image recognition processing on images captured by the camera unit 24 to thereby harvest the detected grapes. The image recognition processing is performed using the detection task obtained through machine learning. The training images K1 acquired by the image acquisition device 31 are used as training data in the machine learning for the image recognition processing. The trained model, which can be obtained through the machine learning, is used as the detection task in the image recognition processing. The robot arm device 20 harvests the detected grapes by the end effector 23.

The robot arm device 20 includes a vehicle 2, an articulated robot arm 21, the end effector 23, the image acquisition device 31, and the robot-arm-control device 25.

(Vehicle)

The vehicle 2 is an apparatus for self-driving to a predetermined location by remote control using a control signal from an external source or by automatic driving along a set route. The vehicle 2 is, by way of example, configured as a four-wheeled vehicle.

(Articulated Robot Arm)

As shown in FIG. 4, the articulated robot arm 21 is a robot arm of a serial link mechanism in which links are connected in series from a proximal end 21a to a distal end 21b via rotary joints each having one degree of freedom. The articulated robot arm 21 is, for example, a vertical articulated robot arm having a movable section of six degrees of freedom. The articulated robot arm 21 is provided on the vehicle 2.

Specifically, the articulated robot arm 21 has a plurality of links 22a and a plurality of rotary joints 22b. The rotary joints 22b each have an actuator (not shown) for driving their respective links 22a. The actuators include, for example, motors. The driving of the rotary joints 22b is controlled by the robot-arm-control device 25.

The articulated robot arm 21 thus configured can move the end effector 23, which is fixed to an output shaft of a motor unit at the distal end 21b, to any position and also place the end effector 23 in any orientation, within a six-degrees-of-freedom movable space of the articulated robot arm 21.

The configuration of the articulated robot arm 21 is similar to that of a typical articulated robot arm. Therefore, a detailed description of the articulated robot arm 21 is omitted. Note that the configuration of the articulated robot arm 21 is not limited to that shown in each figure, as long as the configuration can be used for performing a task on grapes.

(End Effector)

As shown in FIGS. 4 and 5, the end effector 23 is a device for performing a task on grapes. The end effector 23 according to the embodiment of the present teaching is a device for collecting grapes. As described above, the end effector 23 is fixed to the distal end 21b of the articulated robot arm 21. The end effector 23 includes the gripping device 23a for gripping agricultural products and the cutting device 23b for separating agricultural products from branches and stems.

The gripping device 23a is configured to enable its claws to open and close in the left-right direction.

The cutting device 23b is configured to be capable of advancing and retracting.

The gripping device 23a and the cutting device 23b are driven by a motor, for example. The end effector 23 grips the stem of the grapes to be harvested with the gripping device 23a and then uses the cutting device 23b to cut the stem at a position closer to the trunk than where it is gripped, thereby harvesting the grapes. At the start of controlling the harvest work, the gripping device 23a is set to its open state, and the cutting device 23b is set to its retracted state, as shown in FIG. 7. When the stem of the grapes to be harvested is gripped by the gripping device 23a, the gripping device 23a changes to its closed state. With the forward movement of the cutting device 23b, while the stem of the grapes to be harvested is gripped by the gripping device 23a, the grape stem is cut at a position closer to the trunk.

(Image Acquisition Device)

The image acquisition device 31 has the camera unit 24 and the second imaging controller 12. The second imaging controller 12 is, for example, provided in the robot-arm-control device 25 of the robot arm device 20.

The camera unit 24 captures a recognition image K2 for executing the detection task while attached to the robot arm device 20. As described above, the recognition image K2 captured by the camera unit 24 is generated based on a parallax image.

As shown in FIG. 5, the camera unit 24 is supported on the upper surface of the end effector 23 via the base 24*a*. The camera unit 24 can be detached from the end effector 23 by detaching the base 24*a* from the upper surface of the end effector 23. The camera unit 24, detached from the end effector 23, can be attached to the imaging tool 32 as described above. The camera unit 24 is disposed to capture the range of the angle of view R2 in front of the end effector 23. As shown in FIG. 7, the camera unit 24 is disposed on the end effector 23 such that a part of the upper surface of the end effector 23 and a part of the gripping device 23*a* of the end effector 23 are included within the angle of view R2 of the camera unit 24.

The connection cable L2 of the camera unit 24 extends rearward of the end effector 23. That is, the connection cable L2 of the camera unit 24 is disposed outside the range of the angle of view R2. Note that the connection cable L2 is electrically connected to the camera unit 24 and the second imaging controller 12 of the robot-arm-control device 25. The connection cable L2 is connected to the camera unit 24 to be attachable to and detachable from the camera unit 24. The connection cable L2 includes a power line for transmitting electricity from the robot-arm-control device 25 to the camera unit 24, and a signal line for transmitting control signals between the camera unit 24 and the robot-arm-control device 25.

(Robot-Arm-Control Device)

Next, the configuration of the robot-arm-control device 25 will be described with reference to FIGS. 4 to 7. The robot-arm-control device 25 is a device for controlling the articulated robot arm 21, the end effector 23, and the camera unit 24.

As shown in FIG. 6, the robot-arm-control device 25 may be, in substance, configured with components such as a CPU, ROM, RAM, HDD, and SSD connected via a bus, or it may be constituted by a single-chip LSI and the like. The robot-arm-control device 25 stores various programs and data to control functions of the articulated robot arm 21, the camera unit 24, and the end effector 23.

The robot-arm-control device 25 includes the second imaging controller 12 as the imaging controller constituting the image acquisition device 31, as well as an image recognition processor 27 and a driving controller 28.

The driving controller 28 is a control device for controlling a motor of the end effector 23 and a motor unit of each axis of the articulated robot arm 21. The driving controller 28 is connected to drive circuits of motors included in the motor units of respective axes of the articulated robot arm 21 and in motor units of the gripping device 23*a* and the cutting device 23*b* of the end effector 23 so as to be capable of transmitting control signals to these drive circuits. In addition, the driving controller 28 can acquire rotation position information (encoder signals) of the motors from the motor units. The driving controller 28 controls the driving of the articulated robot arm 21, thereby allowing the end effector 23 to be placed in any position and in any orientation.

The second imaging controller 12 is connected to the camera unit 24 via the connection cable L2, and acquires a recognition image K2 captured by the camera unit 24. The second imaging controller 12 outputs the acquired recognition image K2 to the image recognition processor 27.

The image recognition processor 27 performs the image recognition processing of grapes based on the recognition image K2. That is, the image recognition processor 27 is a control device for executing the detection task to detect grapes G1 as the target to be harvested (hereinafter simply referred to as "target grape G1"), from the recognition image K2. The image recognition processor 27 outputs coordinate information and distance information of the target grape G1 detected through the detection task to the driving controller 28. The driving controller 28 moves the end effector 23 towards the target grape G1 based on the coordinate information output by the image recognition processor 27, and transmits control signals to the drive circuits of the motors on the gripping device 23*a* and the cutting device 23*b* of the end effector 23. Thus, the robot-arm-control device 25 can control the position and driving of the end effector 23, thereby enabling the end effector 23 to harvest the target grape G1.

Note that the robot-arm-control device 25 is connected to a communication device 7 such that it can communicate with the communication device 7, and can acquire control signals received by the communication device 7 from the outside. In addition, the robot-arm-control device 25 can continuously transmit control signals generated by the robot-arm-control device 25 or the recognition images K2 captured by the camera unit 24 to the outside via the communication device 7.

As described above, the image acquisition device 31 has the camera unit 24 as the imaging device provided at the robot arm device 20 that serves as the work device for performing a task on the target grape G1 as a target, as well as the imaging controller that controls image capture at the camera unit 24.

In addition, the image acquisition device 31 has the imaging tool 32 that includes the model 33 of the end effector 23 as a part of the robot arm device 20. The imaging tool 32 can be carried by the operator. The camera unit 24 can be attached to and detached from the robot arm device 20 and the imaging tool 32, respectively. The positional relationship of the camera unit 24 with respect to the model 33 with the camera unit 24 attached to the imaging tool 32 is the same as the positional relationship of the camera unit 24 with respect to the robot arm device 20 with the camera unit 24 attached to the robot arm device 20. Furthermore, the camera unit 24 is configured to be attachable to the imaging tool 32 such that a part of the model 33 is included in an image captured by the camera unit 24.

As described above, by using the detection task obtained through machine learning, with the training images K1 acquired by the image acquisition device 31 as the training data, the recognition rate of the target grape G1 to be harvested by the robot arm device 20 can be improved.

Other Embodiments

The embodiment of the present teaching has been described above, but the above-described embodiment is merely an illustrative example for carrying out the present teaching. Therefore, the present teaching is not limited to the above-described embodiment and the above-described embodiment can be appropriately modified and implemented without departing from the gist of the teaching.

In the above-described embodiment, the robot arm device 20 harvests the target grape G1 that is an agricultural product. Alternatively, the robot arm device may have a configuration to not only harvest agricultural products outdoors, but also perform tasks according to the types of end effector attached to the articulated robot arm irrespective of whether it is used outdoors or indoors, such as handling industrial components outdoors.

In the above-described embodiment, the end effector 23 has the gripping device 23a with a specific opening and closing structure and the cutting device 23b with a specific advancing and retracting structure. Alternatively, the end effector only needs to have a configuration to perform a task on a target.

In the above-described embodiment, at the start of controlling the harvest work, the gripping device 23a of the end effector 23 is in its open state and the cutting device 23b of the end effector 23 is in its retracted state. Alternatively, at the start of controlling the harvest work, the gripping device of the end effector may be in its closed state. In addition, at the start of controlling the harvest work, the cutting device of the end effector may be in its advanced state.

In the above-described embodiment, the camera unit 24 attached to the articulated robot arm 21 is disposed on the end effector 23 such that a part of the upper surface of the end effector 23 and a part of the gripping device 23a are included within the angle of view R2 of the camera unit 24. Alternatively, the camera unit only needs to have a configuration that can capture an image of the model, which has the same appearance as the end effector does at the start of controlling the harvest work by the articulated robot arm 21, in a state where the camera unit is attached to the imaging tool.

Although not specifically described in the aforementioned embodiment, the dummy gripping device 33a and the dummy cutting device 33b of the imaging tool 32 may be configured to be capable of changing their states in a similar way as the gripping device 23a and the cutting device 23b. That is, the dummy gripping device may be configured to enable its claws to open and close. The dummy cutting device may be configured to be capable of advancing and retracting. In addition, parts of the image acquisition device 31, which are located outside the angle of view R1 of the camera unit 24, may be omitted. For example, in the above-described embodiment, the dummy cutting device 33b corresponds to the part located outside the angle of view R1 of the camera unit 24. Therefore, in the above-described embodiment, the dummy cutting device 33b may be omitted.

In the above-described embodiment, the camera unit 24 is a stereo camera constituted by a combination of monocular cameras. Alternatively, the camera unit may be a stereo camera constituted by a pair of optical lenses and image sensors housed in a single housing. The camera unit is not limited to a stereo camera, but may be a single monocular camera.

In the above-described embodiment, the camera unit 24 attached to the robot arm device 20 generates a parallax image based on images captured by the two monocular cameras. Alternatively, the camera unit may have a configuration in which the two monocular cameras each transmit the captured image to the robot-arm-control device. The robot-arm-control device may generate a parallax image based on the images transmitted from the camera unit.

In the above-described embodiment, the robot-arm-control device 25 may measure the distance to the target grape G1 based on a parallax image acquired by the camera unit 24. Alternatively, the robot-arm-control device 25 may measure the distance to the target grape using a distance sensor and the like, without using the camera unit.

In the above-described embodiment, the image acquisition device 31 acquires a parallax image as the training image K1. Alternatively, the camera unit may be a single monocular camera and capture a single-viewpoint image as the training image.

In the above-described embodiment, the camera unit 24 is attached to the six-axis articulated robot arm 21 that is the work device. Alternatively, the work device is not limited to the articulated robot arm 21. The work device may be, for example, an unmanned aerial vehicle or a machine tool.

In the above-described embodiment, the imaging tool 32 has the grip for the operator to hold. Alternatively, the imaging tool may have a mobile body for moving the camera unit. That is, the imaging tool may be implemented as a mobile body and may be configured such that the model is attached to the mobile body.

In the above-described embodiment, the image acquisition device 31 captures an image by the camera unit 24 attached to the imaging tool 32 in response to an input event to the trigger button 35. Alternatively, the image acquisition device may be provided with a touch input section, which accepts a touch input, on the display device, and capture an image by the camera unit 24 in response to the touch input to the display device.

In the above-described embodiment, the image acquisition device 31 has the display device 36. Alternatively, the image acquisition device may be without the display device. In addition, the image acquisition device may accept operations by a mobile terminal and capture an image by the camera unit in response to each accepted operation.

In the above-described embodiment, the image acquisition device 31 has the storage device 42 and the transmission device 43. Alternatively, the image acquisition device may be without the storage device or the transmission device.

In the above-described embodiment, the image acquisition device 31 transmits the captured training images K1 to the server 60. The "transmission" herein broadly includes the transfer of data from the image acquisition device to an external server, such as transmitting the training images from the image acquisition device to the external server via a wired network, transmitting the training images from the image acquisition device to the external server via a wireless network, and transferring the training images from the image acquisition device to the external server via an external storage device such as a USB flash drive. In addition, the server 60 performs machine learning based on the training images K1. Alternatively, the image acquisition device may perform machine learning based on the training images by the first imaging controller.

In the above-described embodiment, the image acquisition device 31 captures an image of grapes with the camera unit 24 attached to the end effector 23 of the robot arm device 20 or to the model 33 of the imaging tool 32. Alternatively, the image acquisition device may be configured to detach the end effector together with the camera unit from the articulated robot arm and attach the end effector, with the camera unit attached, to the imaging tool.

In the above-described embodiment, the connection cable L2 is detached from the camera unit 24 attached to the end effector 23 of the robot arm device 20, and then the camera unit 24 is attached to the imaging tool 32, whereas the configuration is not limited to this. Instead of the camera unit itself attached to the robot arm device, a camera unit with the same specifications as a camera unit to be mounted on the robot arm device may be attached to the imaging tool.

Although not specifically described in the aforementioned embodiment, an external communication destination with which the robot-arm-control device 25 communicates by the communication device 7 is not particularly limited, but for example, is the server 60 and an operation terminal for operating the robot arm device. In addition, there are no particular restrictions on the communication method.

REFERENCE SIGNS LIST

11 first imaging controller
12 second imaging controller
20 robot arm device
21 articulated robot arm
23 end effector
24 camera unit
25 robot-arm-control device
23*a* gripping device
23*b* cutting device
27 image recognition processor
28 driving controller
31 image acquisition device
32 imaging tool
33 model
42 storage device
43 transmission device
60 server
G1 target grape

The invention claimed is:

1. An image acquisition device for a work device configured to perform a task on a target, the image acquisition device comprising:

an imaging device including a camera, configured to capture an image of the target; and an imaging tool that includes a model of at least a part of the work device and is operable by an operator, wherein the imaging device is configured to be attachable to and detachable from each of the work device and the imaging tool, in such a way that a relative position between the imaging device and the model, when the imaging device is attached to the imaging tool, is identical to that between the imaging device and the work device when the imaging device is attached to the work device, and capture a part of the model along with the target when the imaging device is attached to the imaging tool, and capture a part of the work device along with the target when the imaging device is attached to the work device, the part of the model corresponding to the part of the work device.

2. The image acquisition device according to claim 1, wherein the imaging tool includes a storage device configured to store each image acquired by the imaging device, and a transmission device configured to output said each image stored in the storage device.

3. The image acquisition device according to claim 1, wherein the model has a same shape and a same color as the at least a part of the work device.

4. The image acquisition device according to claim 2, wherein the model has a same shape and a same color as the at least a part of the work device.

5. The image acquisition device according to claim 1, further comprising an imaging controller including a processor and a non-transitory storage medium, the imaging controller configured to adjust an imaging condition of the imaging device, using the part of the model included in the image captured by the imaging device attached to the imaging tool.

* * * * *